United States Patent [19]

Domeier et al.

[11] Patent Number: 4,755,575

[45] Date of Patent: Jul. 5, 1988

[54] PROCESS FOR PREPARING FIBER REINFORCED MOLDED ARTICLES

[75] Inventors: Linda A. Domeier, Somerville; Richard G. Angell, Jr., Bridgewater, both of N.J.

[73] Assignee: Union Carbide Corporation, Danbury, Conn.

[21] Appl. No.: 889,240

[22] Filed: Jul. 25, 1986

Related U.S. Application Data

[63] Continuation of Ser. No. 279,450, Jul. 1, 1981, abandoned.

[51] Int. Cl.$^4$ .................... C08F 236/22; C08F 236/20
[52] U.S. Cl. .................... 526/313; 526/320; 526/323.1; 526/323.2; 525/44; 525/455; 525/502; 525/531
[58] Field of Search .............. 526/320, 313, 323.2, 526/323.1; 525/531

[56] References Cited

U.S. PATENT DOCUMENTS 3,222,421 12/1965 Lundberg .................... 525/44
4,289,684 9/1981 Kallaur .................... 525/28

FOREIGN PATENT DOCUMENTS 1113567 5/1968 United Kingdom .

Primary Examiner—Patricia Short
Attorney, Agent, or Firm—Paul W. Leuzzi

[57] ABSTRACT

Described herein is an improved process for rapidly fabricating fiber reinforced thermoset resin articles comprising: (a) providing in a heatable matched metal die mold a bonded web of one or more fibers with a melting point or a glass transition temperature above about 130° C., (b) providing in an accumulator zone a liquid body of a thermosettable organic material having a viscosity determined at 120° C., in the absence of curing agent, of less than about 50 centipoises, which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said molding and removing the cured thermoset article therefrom, wherein the improvement comprises improving the release of the cured article from the mold by increasing the cross-link density of the cured thermosettable organic material in the molded article. Also described herein are curable molding compositions used for the rapid fabrication of fiber-reinforced thermoset resin articles having improved mold release characteristics.

6 Claims, 3 Drawing Sheets

PROCESS FOR PREPARING FIBER REINFORCED MOLDED ARTICLES

This application is a Continuation of prior U.S. application: Ser. No. 279,450, Filing Date July 1, 1981, now abandoned.

This invention is directed to an improved process for the rapid fabrication of fiber-reinforced thermoset resin articles having improved mold release characteristics and curable molding compositions useful for such a process.

As is well understood by those skilled in the art of forming thermoset resin articles by a free radical curing reaction, the structure of a thermoset resin is a three dimensional network commonly formed via the free-radical cross-linking reaction of a polyunsaturated oligomer, and in most cases, an ethylenically unsaturated monomer. Unsaturated polyester resins, for example, are widely utilized in making fiber reinforced articles. These unsaturated polyester resins are co-reacted with an ethylenically unsaturated monomer such as styrene. A relatively insoluble and infuseable thermoset resin structure results. When this resin structure is used as a matrix for fibers, the fibers are locked within the framework of the molded article and reinforce the molded articles. This technology is well developed in the art and understood by the skilled artisan.

The fabrication of such fiber reinforced articles is often carried out by effecting the cross-linking or thermosetting reaction in a heated closed mold containing the resin and fiber reinforcement mixture. A novel process for producing fiber reinforced articles is described in U.S. patent application Ser. No. 135,906 entitled "Molding Process and Apparatus Therefore", filed on Apr. 14, 1980, now abandoned, in the name of R. Angell, Jr., which is incorporated herein by reference. In this application, a process for rapidly fabricating fiber reinforced thermoset resin articles is described. The fiber reinforcement is comprised of one or more fibers with a melting point or a glass transition temperature above about 130° C. The process comprises the steps of (a) providing in a heatable matched metal die mold a bonded web of one or more of said fibers, (b) providing in an accumulator zone a liquid body of a thermosettable organic material having a viscosity determined at 120° C., in the absence of curing agent, of less than about 50 centipoises which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom. The fiber reinforcement may be from about 15 to about 80 weight percent of the weight of the molded article which is removed from the mold. A major requirement for the process is low resin viscosity to avoid movement of the reinforcing fibers during resin injection.

The removal of the cured thermoset article from the mold in the above or similar processes requires that the cured article possess sufficient rigidity as it leaves the mold so that it can maintain its form independent of the mold. Also, the cured article must release readily from the mold. Sticking of the cured article to the mold and/or deformation of the article as it is removed from the mold can result in increased molding cycle times, decreased mechanical properties, and potentially additional mold cleaning operations between molding cyles.

Methods which are commonly used for improving mold release characteristics of a molded article are the addition of an internal mold release agent to the resin or the application of an external mold release agent to the surface of the mold. The use of internal mold release agents does provide improved mold release performance, and these materials are commonly added to many thermosetting resin formulations. In many cases, however, it has been found that sticking of the cured article to the mold still occurs. Addition of larger quantites of internal mold release can lead to poorer mechanical properties and also the deposition of a film on the mold.

The use of external mold release agents which are reapplied to the mold between each molding cycle or several molding cycles is a time and labor intensive operation. For that reason, this operation would be undesireable in molding applications where high productivity and short cycle times are required.

A resin providing good intrinsic mold release of the cured article is thus critical to the rapid and continuous fabrication of reinforced articles with good mechanical properties. Articles produced from such resins would be characterized by rapid and facile release from the mold after curing without sticking or deformation of the molded article.

It has been found that both the cross-link density of the cured resin and the shape of the mold are important factors in determining if a given molded article will exhibit the desired mold release characteristics. Other factors, such as the polarity or functionality of the resin, the mold temperature, the amount and type of fiber reinforcement, and the ratio of the resin components may also influence the mold release characteristics of the molded article.

It has now been found that the addition of components which increase the cross-link density of a resin can substantially improve the mold release characteristic of molded articles made from such resins. A resin which exhibits other desirable features such as high composite mechanical properties may thus be modified to improve its mold release in those applications where mold sticking occurs.

A typical thermosetting resin comprises:
(a) a thermosettable organic material containing two or more polymerizable carbon-carbon double bonds, and
(b) a monoethylenically unsaturated monomer which forms a liquid homogeneous mixture with and is co-polymerizable with (a).

The cross-link density of a cured resin containing components (a) and (b) will be a function of both the cross-link density of the individual component (a) and also of the ratio of components (a) and (b).

The cross-link density of component (a) is defined as the number of copolymerizable carbon-carbon double bonds in the molecule divided by the minimum number of atoms required to join all of them together in the molecule. When component (a) comprises a mixture of thermosettable organic materials, the cross-link density is the weighted average of the cross-link densities of the individual components.

For example, the cross-link density of divinylbenzene would be 2 divided by 4 or 0.5 wherein 2 is the number of double bonds in the molecule and 4 is the minimum number of atoms required to join the double bonds together in the molecule. Similarly, the cross-link density of trimethylolpropane triacrylate would be 3 divided by 9 or 0.33.

The cross-link density of the cured resin comprising (a) and (b) is similarly defined as the total number of copolymerizable carbon-carbon double bonds in component (a) divided by the minimum total number of atoms required to join them together in (a) plus the total number of atoms forming copolymerizable carbon-carbon double bonds in (b).

Specific cross-link densities of cured resins are given in the Examples. The cross-link density of the cured resin in Example 2 was thus calculated as $$\frac{2 + 1.95}{19 + 5.86 + 6.95 + 4.37} = 0.109$$

wherein 2 was the number of double bonds in ethoxylated bisphenol A dimethacrylate, 1.95 was the number of double bonds in ethylene glycol dimethacrylate corrected for the presence of 0.977 moles of ethylene glycol dimethacrylate per mole of ethoxylated bisphenol A dimethacrylate in the formulation, 19 was the number of minimum connecting atoms in ethoxylated bisphenol A dimethacrylate, 5.86 was the corrected minimum required connecting atoms in ethylene glycol dimethacrylate (i.e., 6×0.977), 6.95 was twice the number of moles of styrene present per mole of ethoxylated bisphenol A dimethacrylate, and 4.37 was twice the number of moles of hydroxyethyl methacrylate present per mole of ethoxylated bisphenol A dimethacrylate.

The cross-link density of the cured resin will thus vary with the amount of component (b) present. Increasing amounts of (b) will result in a lower cross-link density in the cured article as the chains of (b) joining the molecules of component (a) become longer.

In addition to the cross-link density of the cured resin, it has also been found that the shape of the article may exacerbate release of the cured article from the plug half of a mold.

The effect of mold shape on molded article surface quality has been previously described in "Optimizing Power Dome Design on SMC Grille Opening Panels" by S. C. Mishra, pages 102–106 1980 SPE NATEC. A correlation between mold shape and molded part release has now been found. The bumper beam (see FIGS. 2 and 3) and tote box (see FIG. 4) are compared as shapes which have different release characteristics in a molding process. The tote box is essentially a uniform structure where the part can shrink only in the thickness dimension during cure while the mold is closed. Shrinkage in the lateral and longitudinal directions is eliminated by the mold geometry. As the material tries to shrink it increases the tensile stress in all five flat panels that form this shape. These tensile stresses keep the composite material in intimate contact with the "force" or "plug" half of the mold as long as the mold is closed. However, the condition in the bumper beam is significantly different. This part can be considered as two rectangular boxes molded simultaneously with a connecting web between them. The two boxes are incomplete since one end of each of them is essentially open. This open end is shown near dimension "b" in FIG. 4.

Figure 4:
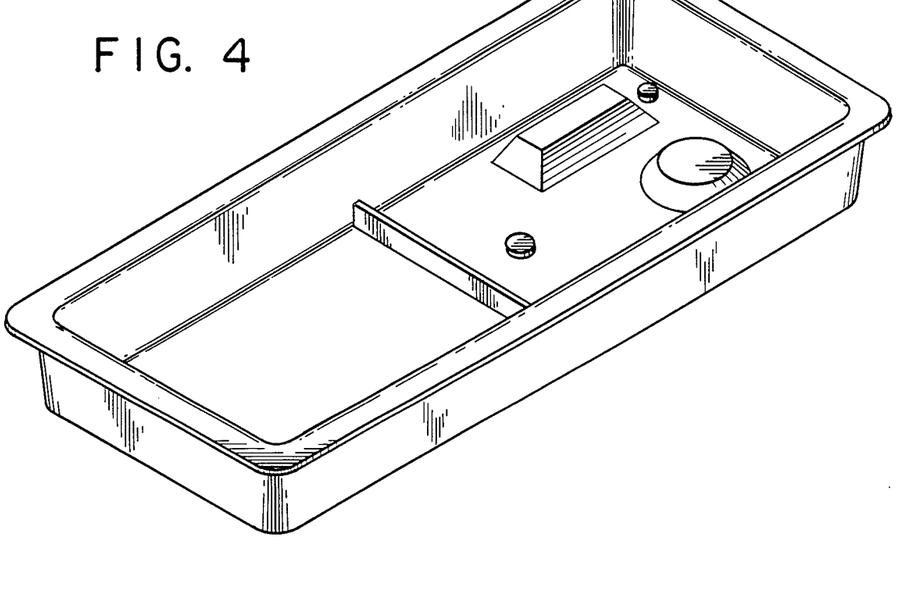
FIG. 4 shows an isomeric view of a tote box.
Figure 5:
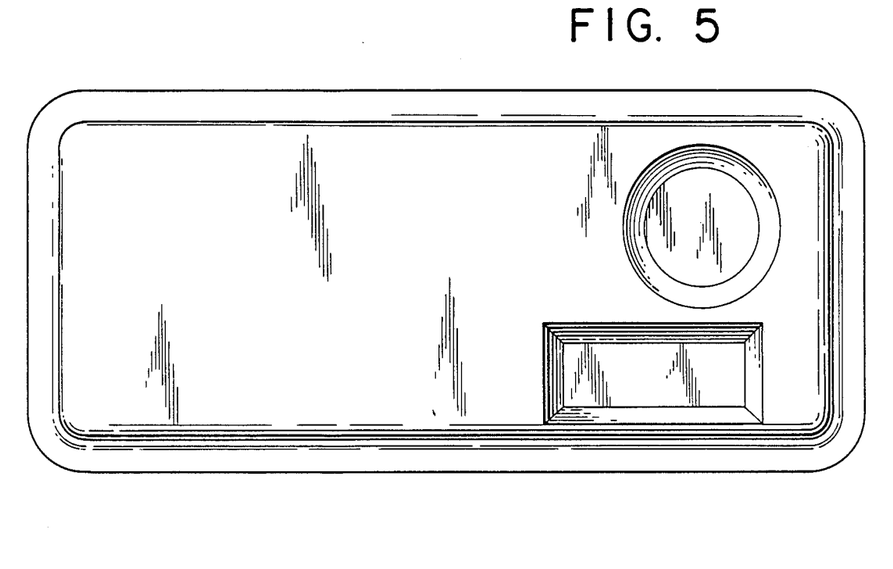
FIG. 5 shows a plan view of a tote box.

With this open end, the composite can shrink in thickness and length as it cures, and relative motion between the composite and the mold surface can exist. In the case of the tote box, no relative motion between the composite and the mold surface can exist and sticking of the composite to the mold can become a problem.

Given a combination of a particular resin comprising components (a) and (b) and a particular mold design which leads to poor mold release of the cured article, it has now been found that increasing the cross-link density of the cured resin by one or more of the following methods provides a resin composition having improved mold release of the cured article.

These methods include the following:
(I) Increasing the ratio of component (a) to component (b) in the resin composition.
(II) Incorporating an additional thermosettable organic material (c) containing two or more polymerizable carbon-carbon double bonds to a mixture of components (a) and (b) such that the ratio of component (a) to component (b) remains unchanged. This additional thermosettable organic material (c) may be the same as those suitable for component (a).
(III) Replacing a portion of component (a) with a thermosettable organic material (c) containing two or more polymerizable carbon-carbon double bonds such that the total amount of component (b) in the resin mixture remains unchanged. In this case, the cross-link density of the thermosettable organic material (c) must be greater than that of component (a).
(IV) Replacing a portion of component (b) with a thermosettable organic material (c) containing two or more polymerizable carbon-carbon double bonds such that the amount of component (a) is unchanged. The thermosettable organic material (c) may be the same as those suitable for component (a).

In certain molding applications, as discussed below, articles molded from resins containing components (a) and (b) may exhibit poor mold release characteristics due to an insufficient cross-link density in the cured article. While the cross-link density of the cured resin may be increased by methods I, II or IV, such a modification may be limited in some cases by other restrictions on the resin composition, such as viscosity and cure speed, or on the cured article, such as mechanical properties. In those cases, a modification by method III whereby the amount of component (b) is unchanged may be preferred.

THE INVENTION

This invention is directed to an improved process for rapidly fabricating fiber reinforced thermoset resin articles comprising: (a) providing in a heatable matched metal die mold a bonded web of one or more fibers with a melting point or a glass transition temperature above about 130° C., (b) providing in an accumulator zone, a liquid body of a thermosettable organic material having a viscosity determined at 120° C., in the absence of curing agent, of less than about 50 centipoises which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said molding and removing the cured thermoset article therefrom, wherein the improvement comprises improving the release of the cured article from the mold by increasing the cross-link density of the cured themosettable organic material in the molded article.

The present invention is also directed to curable molding compositions used for the rapid fabrication of fiber reinforced articles having improved mold release characteristics, which composition comprises:
(a) a thermosettable organic material containing two or more polymerizable carbon-carbon double bonds,
(b) a monoethylenically unsaturated monomer which forms a liquid homogeneous mixture with and is copolymerizable with (a), and
(c) a thermosettable organic material containing two or more polymerizable carbon-carbon double bonds having a cross-link density greater than (a) and containing allyl, vinyl, acrylic and methacrylic types of carbon-carbon double bonds.

These compositions are especially suitable for the rapid fabrication of cured articles having improved mold release characteristics in molds having shapes that cause problems in releasing the molded article therefrom.

Given a combination of a particular resin comprising components (a) and (b) and a particular mold design which leads to poor mold release of the cured article, it has been found that replacement of a portion of component (a) with a second thermosettable organic material (c) having a cross-link density greater than (a) provides a resin having improved mold release characteristics.

Component (a) may be selected from one or more of the following materials:

(1) An unsaturated polyester. These polyesters are typically the condensation products of a diol and an unsaturated dicarboxylic acid or anhydride. The diol is generally selected from ethylene glycol, diethylene glycol, propylene glycol, dipropylene glycol, neopentyl glycol, alkoxylated derivatives of bisphenol-A, 2,2,4-trimethyl-1,3-pentanediol, 2,2-dimethyl-3-hydroxypropyl 2,2-dimethyl-3-hydroxypropionate, and 1,3-butanediol. The unsaturated acids include maleic acid and fumaric acid. Acids without reactive double bonds which may be used in modifying amounts include phthalic acid, isophthalic acid, terephthalic acid, and adipic acid. Anhydrides of the above acids, such as maleic anhydride and phthalic anhydride, are often used.

The unsaturated polyesters are generally prepared by heating approximately equimolar amounts of the diol with the carboxylic acid or anhydride at temperatures in excess of about 200° C. for periods of about 4 to about 24 hours. The polyesters typically have number average molecular weights (Mn) in the range of from about 500 to about 5000, and they contain unsaturation distributed along the chain. These polyesters have acid numbers in the range of from about 2 to about 60. (The acid number is the milligrams of potassium hydroxide needed to neutralize one gram of sample). Many of the polyesters have hydroxyl numbers approximately equal to or greater than their acid numbers.

An additional group of polyesters are also contemplated for use herein. These polyesters are prepared by incorporating dicyclopentadiene into the backbone of the polyester. These polyesters are described, for example, in U.S. Pat. Nos. 3,347,806; 3,933,757; 4,029,848; 4,148,765 and 4,224,430.

(2) A half-ester of a hydroxyl-terminated polyester characterized by the following empirical formula:

wherein n has an average value between about 1.5 and 2, m is 2-n, R is the hydroxyl-free residue of a predominantly hydroxyl-terminated polyester having a molecular weight not exceeding about 1500 and obtained by the condensation of a diol with a dicarboxylic acid or anhydride.

These are described in U.S. patent application Ser. No. 135,905 filed in the name of H. C. Gardner on Apr. 14, 1980, now U.S. Pat. No. 4,294,751, and titled "Polyester Resin Compositions."

The predominantly hydroxy-terminated polyester used to produce the half ester is typically prepared from (a) a diol selected from the class consisting of 1,2-propylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, and mixtures thereof, and mixtures of ethylene glycol and the aforementioned diols, and (b) a dicarboxylic acid or anhydride selected from the class consisting of maleic acid and anhydride, fumaric acid, orthophthalic acid and anhydride, isophthalic acid, terephthalic acid, bicyclo[2.2.1]hept-5-ene-2,3-dicarboxylic acid and bicyclo[2.2.1]hept-5-ene-2, 3-dicarboxylic acid anhydride, and mixtures thereof. The diol and dicarboxylic acid or anhydride are heated until a polyester is formed possessing an acid number of less than about 15, preferably less than about 10 and most preferably, less than about 5. When the molar ratio of diols to dicarboxylic acids is greater than about 1.5, the hydroxyl number is typically in excess of about 65, and most desirably in excess of 100. Hydroxyl numbers for the hydroxyl terminated polyeseter can be as high as 250 and greater. Polyester esterification catalysts such as amines or tin compounds may optionally be used to increase the rate of formation of the polyester.

The half ester of formula (I) is conveniently prepared by reacting the predominantly hydroxyl-terminated polyester oligomer with maleic anhydride in a stoichiometric ratio of one mole of hydroxyl per 0.75 to 1.2 moles of maleic anhydride. A catalyst may optionally be used to carry out this reaction. These catalysts include tin compounds and amine compounds.

(3) A half ester of an organic polyol characterized by the following empirical formula:

wherein a is a number having an average value of about 1.5 to less than about 4, b is equal to the free valence of $R_1$ less the average value of a, $R_1$ is the hydroxyl-free residue of an organic polyol which contained from 2 to 4 inclusive, hydroxyl groups, OH, in formula (II).

The organic polyol which is reacted with the maleic anhydride to form the half ester depicted by empirical formula (II) contains at least two carbon atoms and which may contain from 2 to 4, inclusive, hydroxyl groups. These polyols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentane diol, dipropylene glycol, propylene glycol, polypropylene glycol having an average molecular weight of about 150 to about 600, triethylene glycol, 1,4-cyclohexane dimethanol, neopentyl glycol, 2,2-dimethyl-3-hydroxypropyl 2,2-dimethyl-3-hydroxypropionate, the ethylene and propylene oxide adducts of 2,2-dimethyl-3-hydroxypropyl 2,2-dimethyl-3-hydroxypropionate, triethanolamine, 1,3-butanediol, tetraethylene glycol, 2,2-bis(4-hydroxyphenyl)propane and the ethylene and propylene oxide adducts of 2,2-bis(4-hydroxyphenyl)propane, pentaerythritol, erythritol, glycerine, trimethylolpropane, 1,4-butanediol, 1,6-hexanediol, the polycaprolactone ester of a polyol in which from about 1 to about 5, preferably from about 1.5 to about 4.0 equivalents of caprolactone are esterified with a polyol (as described in, for example, U.S. Pat. No. 3,169,045) such as trimethylolpropane or diethylene glycol (preferably the polycaprolactone ester of a polyol is the polycaprolactone ester of trimethylolpropane in which about 1.5 equivalents of caprolactone are reacted with trimethylolpropane or the polycaprolactone ester of trimethylolpropane where about 3.6 equivalents of caprolactone are esterified with trimethylolpropane), 2-ethyl-1,3-hexanediol, 1,5-pentanediol, tripropylene glycol, 2,2-bis(4-hydroxycyclohexyl)propane, 1,2,6-hexane triol, 1,3-propane diol, and the like.

The half-esters of formula (II) are described in for example U.S. Pat. No. 4,263,413.

(4) A poly(acrylate) characterized by the following empirical formula:

(III)

wherein $R_3$ is the hydroxy-free residue of an organic polyhydric alcohol which contained alcoholic hydroxyl groups bonded to different carbon atoms, $R_2$ and $R_4$ are independently hydrogen or methyl, and $c$ is 1 to 3.

The polyhydric alcohol suitable for preparing the poly(acrylate) typically contains at least two carbon atoms and may contain from 2 to 4, inclusive, hydroxyl groups. These polyhydric alcohols include alkane diols, triols, tetraols, aliphatic ether containing diols, triols, tetraols, cycloaliphatic containing diols, triols, and tetraols, and aromatic containing diols, triols, and tetraols, and the like. Specific illustrations of organic polyols suitable in the practice of this invention include the following: ethylene glycol, diethylene glycol, 2,2,4-trimethyl-1,3-pentanediol, dipropylene glycol, propylene glycol, polypropylene glycol having an average molecular weight of about 150 to about 600, triethylene glycol, 1,4-cyclohexane dimethanol, neopentyl glycol, 2,2-dimethyl-3-hydroxypropyl 2,2-dimethyl-3-hydroxypropionate, polyethylene glycol having an average molecular weight of 150 to about 600, 2,2-bis[4-(2-hydroxyethoxy)phenyl]propane, 2,2-bis[4-(2-hydroxypropoxy)phenyl]propane, triethanolamine, 1,3-butanediol, tetraethylene glycol, 2,2-bis(4-hydroxyphenyl)propane, glycerine, trimethylolpropane, 1,4-butanediol, the polycaprolactone ester of trimethylolpropane which contains about 1.5 equivalents of caprolactone ester, the polycaprolactone ester of trimethylolpropane which contains about 3.6 equivalents of caprolactone, 2-ethyl-1,3-hexanediol, 1,5-pentanediol, tripropylene glycol, 2,2-bis-(4-hydroxycyclohexyl)propane, 1,2,6-hexane triol, 1,3-propanediol, 1,6-hexanediol and the like. Mixtures of the aformentioned polyols may also be used in this invention.

The poly(acrylate) of the aforementioned organic polyhydric alcohol can be prepared by the reaction of acrylic acid or methacrylic acid or their simple esters with the polyhydric alcohol under conditions well known in the art.

(5) A vinyl ester resin produced by the addition of an unsaturated monocarboxylic acid to a polyepoxide.

The vinyl esters which may be used in this invention are produced from the addition of an unsaturated monocarboxylic acid to a polyepoxide. These vinyl esters are well known in the art and many are commercially available. These are described in, for example, U.S. Pat. Nos. 3,377,406; 3,637,618; 4,197,340 3,317,365, and 3,373,075.

The unsaturated carboxylic acid which may be used includes acrylic acid, methacrylic acid, crotonic acid, and acids prepared from the reaction of hydroxyalkyl acrylates or methacrylates with maleic anhydride, phthalic anhydride, and the like.

The polyepoxides may be saturated or unsaturated, aliphatic, cycloaliphatic, aromatic or heterocyclic and may be substituted, if desired, with non-interfering substituents, such as halogen atoms, hydroxyl groups, ether radicals, and the like.

The epoxides which may be used herein include: glycidyl ethers of novolac resins, i.e., phenol-aldehyde condensates. Preferred resins of this type are those of the formula:

wherein $R_5$ is hydrogen or an alkyl radical and $d$ has a value of from 0.1 to about 5, and preferably less than 1.0. Preparation of these polyepoxides is illustrated in, for example, U.S. Pat. Nos. 2,216,099 and 2,658,885.

Other groups of epoxy-containing compounds suitable for use herein include: the epoxidized esters of the polyethylenically unsaturated monocarboxylic acids such as epoxidized linseed or soybean oil, methyl linoleate, monoglycerides of tung oil fatty acids, and the like; the epoxidized esters of unsaturated monohydric alco- hols and polycarboxylic acids such as, di(2,3-epoxyoctyl)pimelate, and the like, epoxidized esters of unsaturated alcohols and unsaturated carboxylic acids such as 3,4-epoxycyclohexylmethyl-3,4-epoxycyclohexane carboxylate, and the like; epoxidized derivatives of polyethylenically unsaturated polycarboxylic acids, such as dimethyl 8,9,12,13-diepoxyeicosanedionate, and the like, epoxidized polyesters obtained by reacting an unsaturated polyhydric alcohol and/or unsaturated polycarboxylic acid or anhydride, such as the polyester obtained by reacting 8,9,12,13-eicosanedienedioic acid with ethylene glycol, and the like, and expoxidized polyethylenically unsaturated hydrocarbons, such as the epoxidized 2,2-bis(2-cyclohexenyl)-propane and epoxidized dimer of cyclopentadiene, and the like.

A preferred polyepoxide includes the glycidyl polyethers of polyhydric phenols and polyhydric alcohols. Especially preferred are the diglycidyl polyethers of 2,2-bis(4-hydroxyphenyl)propane having the following formula:

wherein e has values so that the average molecular weight of the saturated polyepoxide is from 340 to about 2000. Acid modified vinyl ester resins may also be included in this invention. These are described, for example, in U.S. Pat. Nos. 3,634,542; 3,548,030 and 3,564,074.

(6) A urethane poly(acrylate) characterized by the following empirical formula:

wherein $R_6$ is hydrogen or methyl; $R_7$ is a linear or branched divalent alkylene or oxyalkylene radical having from 2 to about 5 carbon atoms; $R_8$ is a divalent radical remaining after reaction of a substitued or unsubstitued diisocyanate; $R_9$ is the hydroxyl-free residue of an organic polyhydric alcohol which contained hydroxyl groups bonded to different carbon atoms; and f has an average value of from 2 to 4. These compounds are typically the reaction products of a polyol in which the hydroxyl groups are first reacted with a diisocyanate using one equivalent of diisocyanate per hydroxyl group, and the free isocyanate groups are then reacted with a hydroxyalkyl ester of acrylic or methacrylic acid.

The polyhydric alcohol suitable for preparing the urethane poly(acrylate) typically contains at least two carbon atoms and may contain from 2 to 4, inclusive, hydroxyl groups. Such polyols are described in (3) and (4) supra. A preferred polyol is one based on the polycaprolactone ester of a polyhydric alcohol such as described in, for example, U.S. Pat. No. 3,169,945. Unsaturated polyols may also be used.

Diisocyanates suitable for preparing the urethane poly(acrylate)s are well known in the art and include aromatic, aliphatic, and cycloaliphatic diisocyanates. Such diisocyanates may be extended with small amounts of glycols to lower their melting point and provide a liquid diisocyanate.

The hydroxyalkyl esters suitable for final reaction with the polyisocyanate formed from the polyol and diisocyanate are exemplified by hydroxyethyl acrylate, hydroxypropyl acrylate, hydroxyethyl methacrylate, and hydroxypropyl methacrylate. Any acrylate or methacrylate ester or amide containing an isocyanate reactive group may be used herein, however.

Urethane poly(acrylates) such as the above are described in for example, U.S. Pat. Nos. 3,700,643, 4,131,602, 4,213,837, and 3,772,404.

(7) A urethane poly(acrylate) characterized by the following empirical formula:

wherein $R_{10}$ is hydrogen or methyl; $R_{11}$ is a linear or branched alkylene or oxyalkylene radical having from 2 to about 5 carbon atoms; $R_{12}$ is the polyvalent residue remaining after reaction of a substituted or unsubstitued polyisocyanate; and g has an average value of from about 2 to about 4. These compounds are typically the reaction products of a polyisocyanate with a hydroxyalkyl ester of acrylic or methacrylic acid using one equivalent of the hydroxyalkyl ester per isocyanate group.

Polyisocyanates suitable for preparing the urethane poly(acrylate) are well known in the art and include aromatic, aliphatic, and cycloaliphatic polyisocyanates. Some diisocyanates may be extended with small amounts of glycol to lower their melting point and provide a liquid diisocyanate.

Urethane poly(acrylates) such as the above are described in, for example, U.S. Pat. No. 3,297,745 and British Pat. No. 1,159,552.

(8) A half-ester or half-amide characterized by the following empirical formula:

wherein $R_{13}$ is hydrogen or methyl, $R_{14}$ is an aliphatic or aromatic radical containing from 2 to about 20 carbon atoms, optionally containing —O— or W and Z are independently —O— or and $R_{15}$ is hydrogen or low alkyl. Such compounds are typically the half-ester or half-amide product formed by the reaction of a hydroxy, amino, or alkylamino containing ester or amide derivatives of acrylic or methacrylic acid with maleic anhydride, maleic acid, or fumaric acid. These are described in, for example, U.S. Pat. Nos. 3,150,118 and 3,367,992.

(9) An unsaturated isocyanurate characterized by the following empirical formula:

wherein $R_{16}$ is hydrogen or methyl, $R_{17}$ is a linear or branched alkylene or oxyalkylene radical having from 2 to about 5 carbon atoms, and $R_{18}$ is a divalent radical remaining after reaction of a substituted or unsubstituted diisocyanate. Such products are typically produced by the trimerization reaction of a diisocyanate followed by reaction of the remaining free isocyanate groups with a hydroxyalkyl ester of acrylic or methacrylic acid.

It is understood that during the formation of the isocyanurate, a diisocyanate may participate in the formation of two isocyanurate rings thereby forming cross-linked structures in which the isocyanurate rings may be linked by the diisocyanate used. Polyisocyanates might also be used to increase this type of cross-link formation.

Diisocyanates suitable for preparing the isocyanurate are well known in the art and include aromatic, aliphatic, and cycloaliphatic diisocyanates. Such diisocyanates may be extended with small amounts of glycols to lower their melting point and provide a liquid diisocyanate.

The hyroxyalkyl esters suitable for final reaction with the free isocyanurate groups remaining after trimerization of the diisocyanate to an isocyanurate are exemplified by hydroxyethyl acrylate, hydroxypropyl acrylate, hydroxethyl methacrylate, and hydroxpropyl methacrylate. Any acrylate or methacrylate ester or amide containing an isocyanate reactive group may be used herein, however.

Such unsaturated isocyanurates are described in, for example, U.S. Pat. No. 4,195,146.

(10) Poly(amide-esters) as characterized by the following empirical formula:

wherein $R_{19}$ is independently hydrogen or methyl, $R_{20}$ is independently hydrogen or lower alkyl, and h is 0 or 1. These compounds are typically the reaction product of a vinyl addition prepolymer having a plurality of pendant oxazoline or 5,6-dihydro-4H-1,3-oxazine groups with acrylic or methacrylic acid. Such poly(amide-esters) are described in, for example, British Pat. No. 1,490,308.

(11) A poly(acrylamide) or poly(acrylate-acrylamide) characterized by the following empirical formula:

wherein $R_{23}$ is the polyvalent residue of an organic polyhydric amine or polyhydric aminoalcohol which contained primary or secondary amino groups bonded to different carbon atoms or, in the case of an aminoalcohol, amine and alcohol groups bonded to different carbon atoms; $R_{21}$ and $R_{22}$ are independently hydrogen or methyl; K is independently —O— or $R_{24}$ is hydrogen or lower alkyl; and i is 1 to 3.

The polyhydric amine suitable for preparing the poly(acrylamide) contains at least 2 carbon atoms and may contain 2 to 4, inclusive, terminal or pendant amine groups. The polyhydric amines include alkane polyamines and aromatic containing polyamines. Also included are amine terminated polyamides and polyamines containing ether, amino, and ester groups in the organic residue.

The polyhydric aminoalcohols suitable for preparing the poly(acrylate-acrylamide) contain at least 2 carbon atoms and may contain 2 to 4, inclusive, amine or alcohol groups, with the proviso that at least one group is a primary or secondary amine. These include alkane aminoalcohols and aromatic containing aminoalcohols. Also included are polyhydric aminoalcohols containing ether, amino, amide, and ester groups in the organic residue.

Examples of the above compounds are described in, for example, Japanese publications Nos. J80030502, J80030503, and J80030504 and in U.S. Pat. No. 3,470,079 and British Pat. No. 905,186.

It is understood by those skilled in the art that the thermosettable organic materials described, supra, are only representative of those which may be used in the practice of this invention.

Component (b) is monoethylenically unsaturated monomer which forms a liquid homogeneous mixture with and is copolymerzable with (a). It contains a single —CH=C< group, and preferably a $CH_2$=C< group and includes styrene and its derivatives and homologues, nonfunctionalized esters of acrylic or methacrylic acid (such as ethyl acrylate, butyl acrylate, and methyl methacrylate) unsaturated nitriles (such as acrylonitrile and methacrylonitrile) and the like. Also, the monomers include vinyl esters, e.g., vinyl acetate, vinyl propionate, and the like. Also, included herein are low levels of maleic anhydride. Mixtures of the aforementioned monomers may be effectively employed in the practice of this invention.

Component (b) in the composition of this invention may also include acrylic or methacrylic acid of a functionalized derivative thereof. The functionalized derivatives are characterized by the presence of acrylate, methacrylate, acrylamide, or methacrylamide groups and also by the presence of functional groups such as hydroxyl, amino, alkylamino, and epoxide, for example. Preferred monomers are characterized by the following formula:

wherein $R_{25}$ is hydrogen or methyl; X and Y are independently —O— wherein $R_{28}$ is hydrogen or lower alkyl; $R_{26}$ is an aliphatic or aromatic radical containing from 2 to about 10 carbon atoms, optionally containing —O— or is hydrogen or an aliphatic or aromatic radical containing 1 to 10 carbon atoms; and k is an integer of or greater than 1, preferably 1 to 3.

These functionalized derivatives of acrylic or methacrylic acid include 2-hydroxyethyl acrylate, 2-hydroxyethyl methacrylate, hydroxpropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like, or mixures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of the Formula may also be included.

The most preferred ethylenically unsaturated monomers contemplated in the practice of this invention are styrene and mixtures of styrene with hydroxyalkyl esters of acrylic or methacrylic acid.

Component (c) in the composition of this invention may be selected from those thermosettable organic materials containing two or more polymerizable carbon-carbon double bonds having a cross-link density greater than (a) and containing allyl, vinyl, acrylic, and methacrylic types of reactive carbon-carbon double bonds.

Component (c) may also include divinylbenzene, trivinylbenzene, divinylcyclohexane, trivinylcyclohexane, diallylphthalate, and similar poly(vinyl) or poly(allyl) compounds. Component (c) may also include poly(acrylates) and poly(methacrylates) such as pentaerythritol diacrylate, pentaerythritol dimethacrylate, pentaerythritol triacrylate, pentaerythritol trimethacrylate, trimethylolpropane diacrylate, trimethylolpropane dimethacrylate, trimethylolpropane triacrylate, and trimethylolpropane trimethacrylate.

Component (c) preferably includes one or more of the following compounds: divinylbenzene, trimethylolpropane triacrylate, trimethylolpropane trimethacrylate, pentaerythritol triacrylate, pentaerythritol trimethacrylate, ethylene glycol diacrylate, ethylene glycol dimethacrylate, vinyl esters having a high cross-link density (i.e., greater thaan (a)) such as epoxy novalac based vinyl esters.

In the preferred compositions of this invention, component (a) is present in amounts of from about 10 to about 75, preferably from about 25 to about 60 weight percent; component (b) is present in amounts of from about 10 to about 75, preferably from about 25 to about 65 weight percent; and component (c) is present in amounts of from about 5 to about 50, preferably from about 5 to about 25 weight percent.

A free-radical initiator which initiates curing via the co-reaction of the thermosettable organic materials (a) and (c) and the ethylenically unsaturated monomer (b) is included in this invention. These initiators include azo compound, peroxides, peresters, perketals, and the like.

Azo and peroxide initiators are described by, for example, Gallagher et al. "Organic Peroxides Review, Plastics Design and Processing", July 1978, pages 38–42, and august 1978, pages 60–67, inclusive. The technology disclosed in those two articles is incorporated herein by reference. The choice of the specific peroxide or azo initiators for the purpose of curing the composition of this invention is within the purview of those having skill in this art and the manner in which such peroxides and azo initiators effect a desirable cure is generally characterized in the aforementioned articles.

Examples of such initiators include 1,1-di-t-butylperoxycyclohexane, 2,2-di-t-butylperoxybutane, 2,2-di-t-butylperoxy-4-methylpentane, 2,2-dicumylperoxypropane, butyl 2,2-di-t-butyl-peroxyvalerate, 1,1-bis(2,2,4-trimethylpentyl-2-peroxy)cyclohexane, 2,2'-azo-bis-isobutyronitrile, dibenzoyl peroxide, lauroyl peroxide, di-t-butyl peroxide, diisopropyl peroxide carbonate, t-butylperoxy-2-ethylhexanoate, t-butylperpivalate, 2,5-dimethylhexane-2,5-di-perethylhexnoate, t-butyl peroctoate, t-butyl perneodecanoate, t-butyl perbenzoate, t-butyl percrotonate, t-butyl perisobutyrate, di-t-butyl perphthalate, 1,1-bis(t-butylperoxy)-3,3,5-trimethylcyclohexane, bis(4-t-butylcyclohexyl)peroxydicarbonate, methyl ethyl ketone peroxide, 2,4-pentanedione peroxide, bis(t-butylperoxy)diisopropylbenzene, 2,4,4-trimethylpentyl-2-peroxycyclohexane carboxylate, 2-t-butylazo-2-cyano-4-methylpentane, ethyl 3,3-di(butylperoxy)butyrate, and the like. These are commercially available materials.

The peresters and perketals may be used in combination with an acid cure accelerator as described in Netherlands published patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluene-sulfonic acid, and the like. Also, Lewis acids or metal halides with Lewis acid properties, such as boron trifluoride and the chlorides of iron, cobalt, zinc and aluminum, may be used.

Additionally, the above described initiators may be used in combination with other cure accelerators such as cobalt compounds. These cobalt compounds include cobalt naphthenate, cobalt-amine cure promotors (such as those designated as PEP 183-S and available from Air Produts Incorporated), and the like. These cure accelerators operate by decomposing the curing catalysts at a temperature below their normal activation or decomposition temperature.

Mixtures of the initiators may be used herein, such as mixtures or peresters and/or perketals, of perketals and azo compounds, or of peresters and azo compounds.

The concentration of the initiator can be varied within wide limits. As a representative range, the concentration can vary from about 0.25 to about 3.0 weight percent, preferably from about 0.5 to about 2.5 weight percent, and most preferably, from about 0.75 to about 2.0 weight percent, based on the weight of components (a), (b) and (c).

the compositions of this invention are prepared by solution blending the thermosettable organic materials, the monoethylenically unsaturated monomer, a free radical curing catalyst, and any other optional ingredients at ambient temperatures.

The fibers, which may be used in this invention as reinforcing agents, have a melting point or a glass transition temperature above about 130° C. These fibers include fiberglass, carbon fibers, aromatic polyamide fibers (such as aramide fibers sold by E. I. duPont de Nemours and Company, Wilmington, Del., under the trakemark of Kevlar), metal fibers such as aluminum and steel fibers, boron fibers, and the like.

The carbon fibers include those having a high Young's modulus of elasticity and high tensile strength. These carbon fibers may be produced from pitch, as described in U.S. Pat. Nos. 3,976,729; 4,005,183 and 4,026,788, for example.

The preferred fibers are fiberglass, carbon fibers, aromatic polyamide fibers, and mixtures thereof.

The fibers which are suitable for use in this invention, preferably have a length of at least ¼ inch, and an average length of at least ½ inch. Fibers with different lengths exceeding ¼ inch may be used, provided that at least about 50 percent of the fibers have lengths greater than ½ inch. Preferred fiber lengths are from 1 to 2 or more inches. Continuous filaments may also be used.

It is also within the scope of this invention to include the use of fiber reinforcements of shorter lengths and also fillers such as milled glass.

The molded article contains from 10 to about 75, preferably from about 40 to about 70 weight percent of the reinforcement fiber or from about 20 to about 40 weight percent of milled glass reinforcement.

It is furthermore desirable to utilize a vinyl polymerization inhibitor in those cases where the resin solution is to be stored and/or shipped. Suitable vinyl polymerization inhibitors are hydroquinone, para-benzoquinone, t-butyl catechol, quinhydrone, toluhydroquinone, mono-t-butyl hydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely from about 100 to about 1000 ppm of the combined weight of components (a), (b) and (c).

The instant resin compositions have low viscosities, i.e., less than about 150, preferably less than about 100 centipoise, so that they can be used to produce thermoset resin articles containing up to about 75 weight percent of reinforcing fibers by a very rapid mold cycle.

Reference is made to the Figures which characterize apparatus suitable for molding the compositions of this invention.

It is not intended that the scope of the composition as hereinabove defined by restricted by the specific materials and equipment which are characterized in the Figures since they are intended for illustration purposes only.

Figure 1:
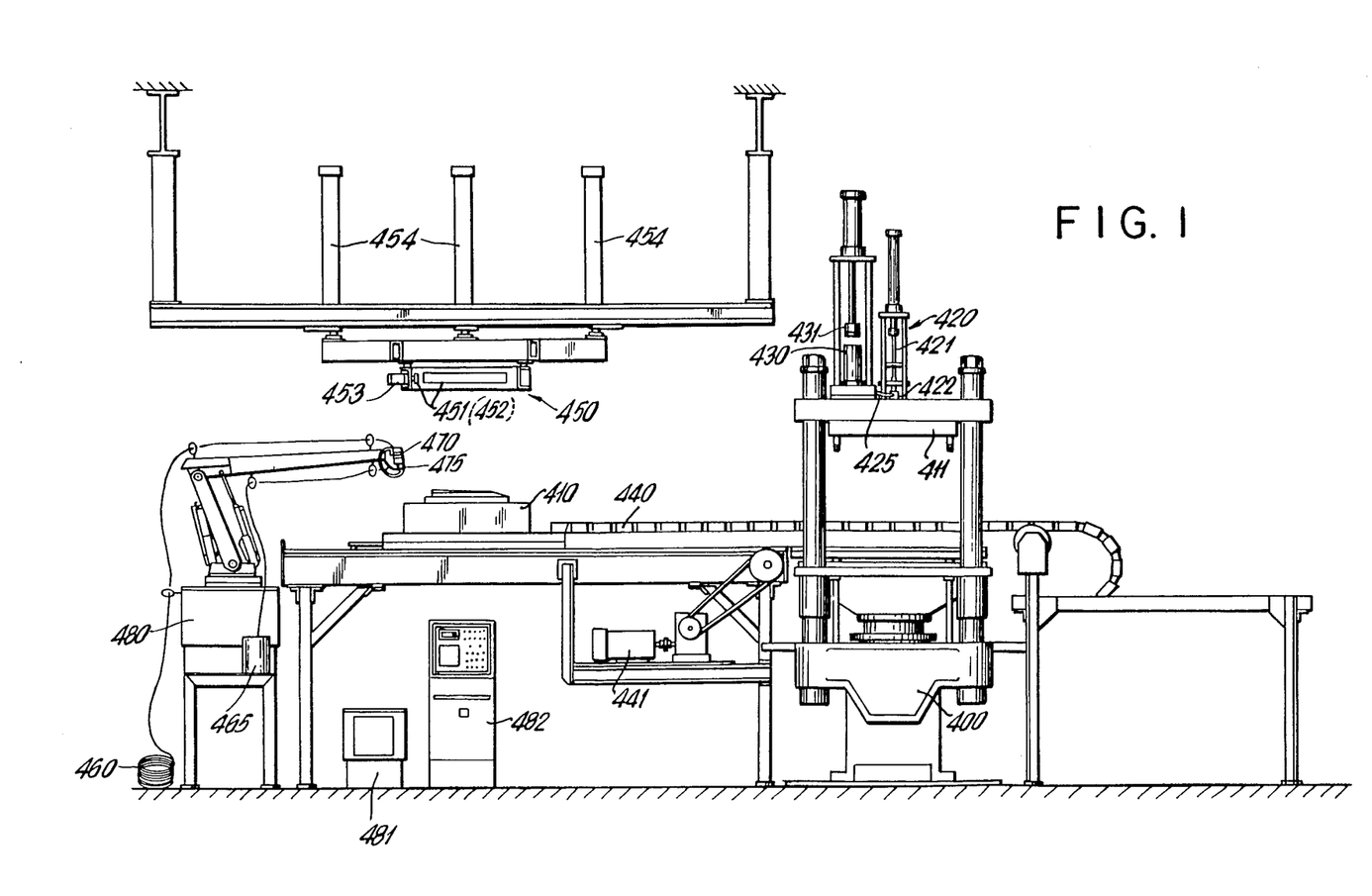
FIG. 1 shows an automated molding system.

FIG. 1 shows an automated molding system. In a typical molding cycle for producing a molded part, the male half of the mold, 410, is placed in a predetermined position adjacent to robot 480. The end of the robot contains a fiberglass chopper, 470, and a binder spray gun 475. The fiberglass chopper 470 draws fiberglass from spool 460 and spray gun 475 is fed binder for the fiberglass from vessel 465. The robot 480 is programmed to spray the mold 410 with fiberglass and binder in a predetermined pattern. The program is stored on a floppy disc in computer control cabinet 482. A hydraulic pump unit 481 supplies the pressure to move the robot to its programmed positions. The robot can be programmed by two techniques, i.e., point to point or continuous path. In the point to point programming technique, the robot is taught specific points with set time intervals between these points. The distance between these points is typically one to four inches. This distance determines the rate of travel of the robot. When the points are close the robot moves slowly and when the points are more distant the robot's speed increases. The robot calculates 80 intermediate points between every programmed point which insures smooth motion between each point and throughout the entire program. When the robot is physically positioned at the programmed points, the points are automatically recorded on a disc in a computer. The program can then be continually replayed. Each programmed point represents an "on" or "off" position for the binder and fiberglass spray.

In the continuous path programming technique, the robot records points at the rate of up to 80 per second depending on the setting and records continuously all points during the teaching path. This technique more storage space on the disc of the computer. Also, since the robot must be moved quickly, accuracy is not nearly as great as with the point to point programming technique wherein the time factor is not part of the program.

One of many programs can be chosen to permit the robot to spray the fiberglass and binder in predetermined patterns. Such programming technques are well known in the art and form no part of this invention.

When the robot has completed spraying its pattern onto the mold surface, it moves to a position away from the mold. Compactor 450 is brought into position about the male mold assembly by hydraulic cylinder 454. Compactor bars 451, each of which contain heaters 452, are positioned to circumscribe the mold and are actuated by hydraulic cylinder 453 to move toward the mold and compress the fiberglass against the mold's sidewall surface. After approximately 30 seconds, compactor bars 451 are removed from the mold by hydraulic cylinder 453. Hydraulic cylinder 454 then raises compactor 450 to a position remote from the mold. The mold is then moved on a track by the mold traverse chain belt mechanism, 440 which is driven by motor 441, to the hydraulic press 400. When the hydraulic press 400 is closed, the male mold 410 comes in contact with female mold 411. When the mold is closed, injection nozzle rod 421 of injection nozzle assembly 420 is retracted from the nozzle 422, said nozzle being positioned in the female half of the mold 411. Resin which is in accumulator 430 is forced by piston 431 through conduit 425 and through nozzle 422 into the mold cavity formed by mold halves 410 and 411. The time to fill the mold is about 10 seconds. Nozzle rod 421 is left open for about an additional 30 seconds before it is closed. This constitutes the dwell time. This also insures removal of all the air surrounding the fiberglass located in the mold cavity. After rod 421 closes, the mold is kept closed for about an additional two minutes to cure the resin. The hydraulic press then opens and a molded part is removed. The male mold 410 is then returned by mold traverse mechanism 440 to the spraying location. The cycle is then ready to be repeated.

Figure 2:
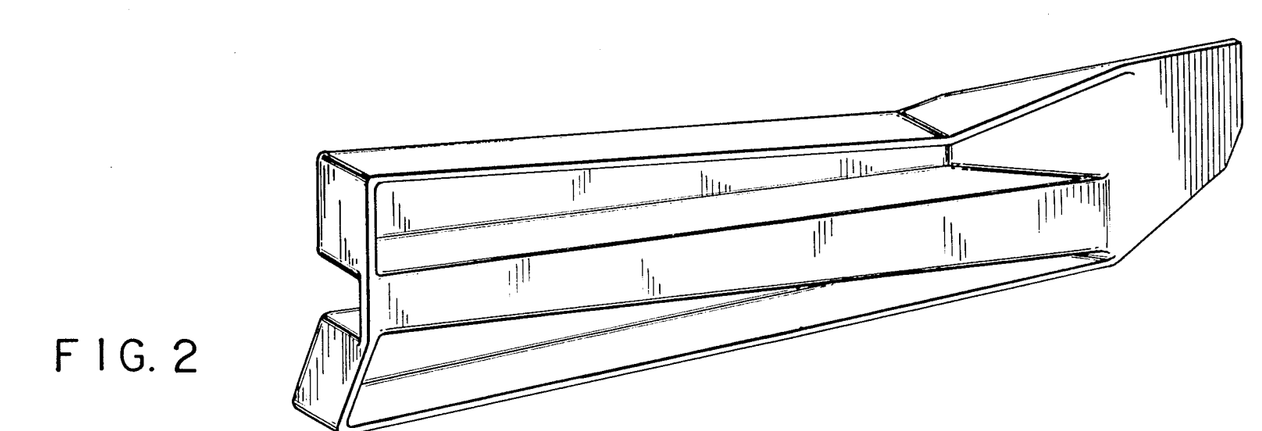
FIGS. 2 and 3 shows an automobile bumper beam.

FIG. 2 shows a perspective view of automobile bumper support beam.

Figure 3:
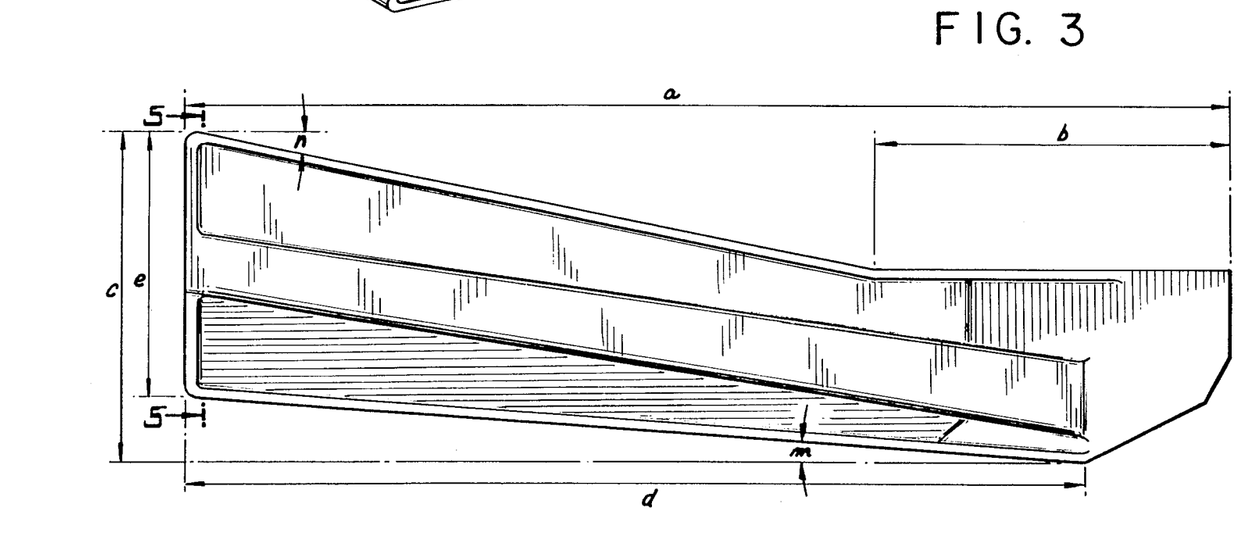

FIG. 3 shows a side elevation of the beam where a is about 23½ inches, b is about 8 inches, c is about 7½ inches, d is about 20 inches, e is about 6 inches, m is about 4 degrees, and n is about 13 degrees.

FIG. 4 shows an isomeric view of a tote box. The overall dimensions of the tote box are 30 inches long, 14 inches wide and 5 inches deep.

EXAMPLES

The following Examples serve to illustrate specific embodiments of this invention and it is not intended that the invention shall be limited by the Examples.

Control A

The automated molding system shown in FIG. 1 was used to mold an automobile bumper support beam as shown in FIGS. 2 and 3. The resin composition was a mixture of a vinyl ester resin, Derakane 411-C50, (The resin contains the reaction product of methacrylic acid with a mixture of diglycidyl polyethers of bisphenol A using approximately one mole of methacrylic acid per mole of epoxide groups. The number average molecular weight of the reaction product was approximately 900 to 1000. The vinyl ester resin is commercially available from Dow Chemical Co., as a 50 percent styrene solution), 0.5 phr (parts per hundred parts of resin) of Zelec UN mold release, and 1.5 phr of tertiary butyl perbenzoate. The composition had a viscosity of about 140 centipoise (25° C.).

The accumulator 430 in FIG. 1 was filled with the resin composition. The accumulator holds enough resin to make 5 parts before refilling is required. The mold was heated with 95 psig steam to a temperature of 160° C. The male half of the mold was sprayed with one inch chopped fiberglass (OCF 447 BA 162 made by Owens Corning Fiberglas Co.) and a latex binder. The binder weight was about 2½% of the chopped fiberglass. An industrial robot (DeVilbiss/Trallfa Tr-3003S) was used to deposit the binder and chopped fiberglass onto the male half of the mold. A Devilbiss AGB 549 automatic spray gun and a Binks renegade chopper Assembly No. 101-8,000 were the components of the head of the robot that sprayed the binder and chopped the fiberglass, respectively. The robot was programmed to spray 750 grams of fiberglass in a predetermined pattern onto the surface of the male half of the mold. A compactor heated to 400° F. compressed the fiberglass and binder against the mold for 30 seconds at a pressure of about 200 to 225 psi. The fiberglass was compressed by the compactor to essentially the thickness of the mold cavity, i.e., 3/16 inch. The compactor was then retracted from the mold. The male half of the mold was then moved to the molding press by the mold transverse chain belt mechanism. The hydraulic press was closed bringing together the two halves of the mold. Once the hydraulic press was up to clamp pressure, i.e., 250 tons, the injection nozzle was opened and the resin was injected into the cavity by the accumulator. The time required to fill the cavity was 36 seconds. The pressure during injection was about 200 psi and it increased to about 1000 psi when the entire cavity was filled with resin. An O-ring around the perimeter of the mold cavity prevented resin from leaking from the mold. The pressure of 1000 psi was maintained for 15 seconds with the nozzle open and then the nozzle was closed. The press remained closed for an additional 80 seconds to cure the resin. When the press opened, a cured molded article weighing 1227 grams was removed. The article contained 60 percent by weight of fiberglass.

The molded article released readily from the mold.

The cured resin had a cross-link density of about 0.034.

The results are summarized in Table I.

Control B

The automated molding system shown in FIG. 1 was used to mold the tote box as shown in FIG. 4. The resin composition was a mixture of Derakane 411-C50 described in Control A, 0.5 phr of Zelec UN mold release, and 1.5 phr of tertiary butyl perbenzoate. The composition had a viscosity of about 140 centipoise (25° C.).

The accumulator 430 in FIG. 1 was filled with the resin composition. The accumulator holds enough resin to make 2 parts before refilling is required. The mold was heated with 120 psig steam to a temperature of 160° C. The male half of the mold was sprayed with one inch chopped fiberglass (OCF 447 BA 162 made by Owens Corning Fiberglas Co.) and a latex binder. The binder weight was about 2½% of the chopped fiberglass. An industrial robot (DeVilbiss/Trallfa Tr-3003S) was used to deposit the binder and chopped fiberglass onto the male half of the mold. A Devilbiss AGB 549 automatic spray gun and a binks renegade chopper Assembly No. 101-8,000 were the components on the head of the robot that sprayed the binder and chopped the fiberglass, respectively. The robot was programmed to spray 2½ lbs. of fiberglass in a predetermined pattern onto the surface of the male half of the mold. A compactor heated to 300° F. compressed the fiberglass and binder against the mold for 5 seconds at a pressure of about 200 to 225 psi. The fiberglass was compressed by the compactor to essentially the thickness of the mold cavity, i.e., ⅛ inch. The compactor was then retracted from the mold. The male half of the mold was then moved to the molding press by the mold transverse chain belt mechanism. The hydraulic press was closed bringing together the two halves of the mold. Once the hydraulic press was up to clamp pressure, i.e., 315 tons, the injection nozzle was opened and the resin was injected into the cavity by the accumulator. The time required to fill the cavity was 10 seconds. The pressure during injection was about 150 psig and it increased to about 300 psi when the entire cavity was filled with resin. An O-ring around the perimeter of the mold cavity prevented resin from leaking from the mold. The pressure of 300 psi was maintained for less than one second with the nozzle open and then the nozzle was closed. The press remained closed for an additional 90 seconds to cure the resin. When the press was opened, a cured part weighing about 5 pounds was removed. The part contained 50 percent by weight of fiberglass and it had to be pryed from the mold causing deformation and breakage of the box.

The cured resin had a cross-link density of about 0.034.

The results are summarized in Table I.

EXAMPLE 1

The procedure of Control B was exactly repeated except that the resin was Derakane 740-36 diluted to contain 50 percent styrene and containing 1.5 phr t-butylperbonzoate and 0.5 phr Zelec UN mold release. (Derakane 470-36 is a vinyl ester resin containing the reaction product of methacrylic acid with a mixture of diglycidyl polyethers of bisphenol A and glycidyl ethers of novolac acid using approximately one mole of methacrylic acid per mole of epoxide groups. The vinyl ester is commercially available from Dow Chemical Co. as a 36 percent styrene solution and was diluted to form a 50/50 viny ether/styrene solution.) Also, the time to fill the mold cavity was 13 seconds and the molded article cured in 70 seconds. The cured resin had a cross-link density of about 0.051.

The molded article released readily from the mold.

The results are summarized in Table I.

The data in Table I, when comparing Controls A and B, shows the effect of mold shape on release of the molded article from the mold. When comparing Control B and Example 1, the data in Table I show the effect of cured resin cross-link density on release of the molded article from the mold.

The composition had a viscosity of about 20 centipose (25° C.).

The accumulator 430 in FIG. 1 was filled with the resin composition. The accumulator holds enough resin to make 2 parts before refilling is required. The mold was heated with 120 psig steam to a temperature of 160° C. The male half of the mold was sprayed with one inch chopped fiberglass (OCF 447 BA 162 made by Ownes Corning Fiberglas Co.) and a latex binder. The binder weight was about 2½ percent of the chopped fiberglass. An industrial robot (DeVilbiss/Trallfa-3003S) was used to deposit the binder and chopped fiberglass onto the male half of the mold. A Devilbiss AGB 549 automatic spray gun and a binks renegade chopper Assembly No. 101-8,000 were the components on the head of the robot that sprayed the binder and chopped the fiberglass, respectively. The robot was programmed to spray 2½ pounds of fiberglass in a predetermined pattern onto the surface of the male half of the mold. A compactor heated to 300° F. compressed the fiberglass and binder against the mold for 5 seconds at a pressure of about 200 to 225 psi. The fiberglass was compressed by the compactor to essentially the thickness of the mold cavity, i.e., ⅛ inch. The compactor was then retracted from the mold. The male half of the mold was then moved to the molding press by the mold transverse chain belt mechanism. The hydraulic press was closed bringing together the two halves of the mold. Once the hydraulic press was up to clamp pressure, i.e., 315 tons, the injection nozzle was opened and the resin was injected into the cavity by the accumulator. The time required to fill the cavity was 9 seconds. The pressure during injection was about 150 psi and it increased to about 450 psi when the entire cavity was filled with resin. An O-ring around the perimeter of the mold cavity prevented resin from leaking from the mold. The pressure of 450 psi was maintained for 10 seconds with the nozzle open and then the nozzle was closed. The press remained closed for an additional 45 seconds to cure the resin. When the press was opened, a cured molded article weighing 5 pounds was removed. The molded article contained 50 percent by weight of fiberglass. The article had to be pryed from the mold surface using a wrecking bar and the molded article was destroyed in the process.

The cured resin had a cross-link density of 0.074.

The results are summarized in Table II.

EXAMPLE 2

TABLE I

| Example | Resin | Molded article | Cross-link density of cured resin | Release Characteristics |
|---|---|---|---|---|
| Control A | Derakane 411-C50 | Bumper beam | 0.034 | Released readily from the mold |
| Control B | Derakane 411-C50 | Tote box | 0.034 | Had to be pryed from mold |
| Example 1 | Derakane 470-36 (diluted to 50 percent styrene | Tote box | 0.051 | Released readily from the mold |

Control C

The automated molding system shown in FIG. 1 was used to mold the tote box as shown in FIG. 4. The resin composition was a mixture of 50 weight percent of ethoxylated bisphenol A, 28 weight percent of styrene, 22 weight percent of 2-hydroxyethyl methacrylate, 0.5 phr of Zelec UN mold release, 1.1 phr of tertiary butyl perbenzoate, and 0.4 phr of tertiary butyl peroctoate.

The procedure of Control C was exactly repeated except that the resin contained 35 wt percent of ethoxylated bisphenol A dimethacrylate, 28 wt. percent of styrene, 22 wt percent of 2-hydroxyethyl methacrylate, 15 wt. percent of ethylene glycol dimethacrylate, 1.1 phr of t-butyl perbenzoate, 0.4 phr of t-butyl peroctoate, and 0.5 phr of Zelec UN mold release. Also, the time to fill the mold cavity ws 12 seconds. The pressure during injection of the resin was about 150 psi and increased to 300 psi. No dwell was applied after injection. The article cured in 48 seconds. The cured resin had a cross-link density of 0.109.

The part released readily from the mold.

The results are summarized in Table II.

EXAMPLE 3

The procedure of Example 2 was exactly repeated except that the resin contained 45 wt. percent of ethoxylated bisphenol A dimethacrylate, 28 wt. percent of styrene, 22 wt. percent of 2-hydroxyethyl methacrylate, 5 wt. percent of trimethylolpropane triacrylate, 1.1 phr of t-butyl perbenzoate, 0.4 phr of t-butyl peroctoate, and 0.5 phr of Zelec UN mold release. Also, the time to fill the mold cavity was 8 seconds. The pressure during injection of the resin was about 150 psi and increased to 800 psi. The article cured in 50 seconds. The cured resin had a cross-link density of 0.085.

The molded article was difficult to remove from the mold.

The results are summarized in Table II.

EXAMPLE 4

The procedure of Example 3 was exactly repeated except that the resin contained 40 wt. percent of ethoxylated bisphenol A dimethacrylate, 28 wt. percent of styrene, 22 wt. percent of 2-hydroxyethyl methacrylate, 10 wt. percent of trimethylolpropane triacrylate, 1.1 phr of t-butyl perbenzoate, 0.4 phr of t-butyl peroctoate and 0.5 phr of Zelec UN mold release. The cured resin had a cross-link density of 0.096.

The molded article released from the mold with some difficulty.

The results are summarized in Table II.

EXAMPLE 5

The procedure of Example 3 was exactly repeated except that the resin contained 35 wt. percent of ethoxylated bisphenol A dimethacrylate, 28 wt. percent of styrene, 22 wt. percent of 2-hydroxyethyl methacrylate, 15 wt. percent of trimethylolpropane triacrylate, 1.1 phr of t-butyl perbenzoate, 0.4 phr of t-butyl peroctoate, and 0.5 phr of Zelec UN mold release. The cured resin had a cross-link density of 0.108.

The molded article released readily from the mold.

The results are summarized in Table II.

What is claimed is:

1. A curable molding composition suitable for use in the rapid fabrication of fiber-reinforced thermoset resin articles having improved mold release characteristics, which composition comprises:

(a) from about 25 to about 60 weight percent of a poly(acrylate) having the following empirical formula:

where $R_3$ is the hydroxy-free residue of an organic polyhydric alcohol which contained alcoholic hydroxy groups bonded to different carbon atoms, $R_2$ and $R_4$ are independently hydrogen or methyl, and c is 1 to 3;

(b) from about 25 to about 65 weight percent of a monoethylenically unsaturated monomer which forms a liquid homogeneous mixture with and is copolymerizable with (a), and (c) from about 15 to about 25 weight percent of a thermosettable organic material containing two or more polymerizable carbon-carbon double bonds having a cross-link density greater than (a) and containing acrylic or methacrylic carbon-carbon double bonds.

2. A composition as defined in claim 1 wherein component (a) comprises ethoxylated bisphenol A dimethacrylate.

3. A composition as defined in claim 1 wherein component (b) comprises styrene, its derivatives or homologues.

4. A composition as defined in claim 3 wherein component (b) is a mixture of styrene and a hydroxyalkyl ester of acrylic or methacrylic acid.

5. A composition as defined in claim 1 wherein component (c) is one or more of trimethylolpropane triacrylate, trimethylolpropane trimethacrylate, pentaerythritol trimethacrylate, ethylene glycol diacrylate or ethylene glycol dimethacrylate.

TABLE II

| Example | Resin Ingredients | wt % | Molded Article | Cross-link density of cured resin | Release Characteristics |
|---|---|---|---|---|---|
| Control C | EBAM | 50 | Tote box | 0.074 | Had to be pryed from the mold |
| | Styrene | 28 | | | |
| | HEMA | 22 | | | |
| 2 | EBAM | 35 | Tote box | 0.109 | Released readily from the mold |
| | Styrene | 28 | | | |
| | HEMA | 22 | | | |
| | EGDM | 15 | | | |
| 3 | EBAM | 45 | Tote box | 0.085 | Difficult to remove from the mold |
| | Styrene | 28 | | | |
| | HEMA | 22 | | | |
| | TMPTA | 5 | | | |
| 4 | EBAM | 40 | Tote box | 0.096 | some difficulty in removal of part |
| | Styrene | 28 | | | |
| | HEMA | 22 | | | |
| | TMPTA | 10 | | | |
| 5 | EBAM | 35 | Tote box | 0.108 | Released readily from the mold |
| | Styrene | 28 | | | |
| | HEMA | 22 | | | |
| | TMPTA | 15 | | | |

[1]EBAM = ethoxylated bisphenol A dimethacrylate
HEMA = 2-hydroxyethyl methacrylate
EGDM = ethylene glycol dimethacrylate
TMPTA - trimethylolpropane triacrylate 6. A composition as defined in claim 1 having a viscosity determined at 120° C., in the absence of a curing agent, of less than about 50 centipoises, such that (i) the composition can be injected into a mold containing a bonded web of one or more fibers with a melting point or a glass transition temperature above about 130° C. and (ii) a cured fiber-reinforced article is formed thereby.

* * * * *